(12) United States Patent
Oates et al.

(10) Patent No.: US 7,006,474 B2
(45) Date of Patent: Feb. 28, 2006

(54) CHANNELIZED RECEIVER SYSTEM

(75) Inventors: Edward Rumsey Oates, Ft. Wayne, IN (US); John Paul Johnston, Ft. Wayne, IN (US); Tom Bell Chamberlain, Ft. Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 938 days.

(21) Appl. No.: 09/990,496

(22) Filed: Nov. 21, 2001

(65) Prior Publication Data

US 2003/0096586 A1 May 22, 2003

(51) Int. Cl.
*H04Q 7/00* (2006.01)

(52) U.S. Cl. .................. 370/334; 375/316; 375/350

(58) Field of Classification Search .............. 434/2; 375/316; 455/226.1; 324/76.29, 76.31; 342/13, 371; 370/329, 341
See application file for complete search history.

(56) References Cited

U.S. PATENT DOCUMENTS

| | | | |
|---|---|---|---|
| 4,352,208 A | * | 9/1982 | Schroeder ............. 455/266 |
| 5,121,413 A | | 6/1992 | Voegtly et al. |
| 5,477,227 A | * | 12/1995 | Noneman ............. 342/195 |
| 5,572,213 A | | 11/1996 | Noneman et al. |
| 6,043,771 A | | 3/2000 | Clark et al. |
| 6,091,523 A | | 7/2000 | Brandstetter |
| 6,313,620 B1 | | 11/2001 | Richardson et al. |

\* cited by examiner

*Primary Examiner*—Duc Ho
(74) *Attorney, Agent, or Firm*—Edell, Shapiro & Finnan

(57) ABSTRACT

A channelizing receiver is provided with a plurality of channel receivers for monitoring respective segments of a frequency band being monitored by the channelizing receiver. Each channel receiver includes a channel processor for detecting an electromagnetic signal, measuring the peak amplitude of the electromagnetic signal and comparing this peak amplitude with the peak amplitudes for the electromagnetic signal detected by adjacent channel receivers. Data responsive to a detected signal is transmitted from a channel receiver only if the channel receiver's measured peak amplitude is higher than that for the adjacent channel receivers. The data include an estimate of the frequency and bandwidth of the detected signal made by the channel receiver transmitting the data based upon an assessment of the relative peak amplitudes.

64 Claims, 6 Drawing Sheets

CHANNELIZED RECEIVER SYSTEM

BACKGROUND OF THE INVENTION

The present invention relates to a receiver system for receiving and detecting electromagnetic signals and, in particular, to a channelizing receiver system for receiving and detecting electromagnetic signals and for providing information regarding the characteristics of these signals. The present invention also relates to a method for detecting and characterizing electromagnetic signals using a channelized receiver system.

Systems for scanning and detecting a wide range of electromagnetic signals and, in particular radio frequency (RF) signals, and for analyzing the detected signals are widely used for electronic warfare (EW) and for other military and non-military applications. Systems performing such functions may employ a searching system and an analyzing system. A channelizing receiver often is used for the searching system.

A channelizing receiver typically includes a number of uniformly spaced, narrow bandwidth receivers which together contiguously cover the entire electromagnetic spectrum of interest. Each narrow bandwidth receiver (channel receiver) typically includes a log detector, for converting RF emissions into a log video signal, and a threshold detector for evaluating the signal generated by the log detector. The particular channel receiver of the channelizing receiver providing an output signal provides a rough estimate of a detected signal's time of arrival, pulse width and frequency. If several channel receivers provide output signals, the output signal having the greatest magnitude may be used to provide this rough estimate.

Information from the channelizing receiver often is transmitted to an analyzing receiver. The analyzing receiver performs a more extensive analysis of the particular signal to precisely measure the signal's frequency, bandwidth and pulse width and also to determine the signal's phase and modulation. The information from the channelizing receiver, however, enables the analyzing receiver to perform this function more efficiently and effectively. By screening noise and other signals of no interest, the channelizing receiver enables the analyzing receiver to focus only on the signals of importance.

Current channelizing receivers suffer, however, from a number of deficiencies. First, each channel receiver must be capable of detecting the majority of electromagnetic emissions within its designated bandwidth. As a result, the channel receiver cannot be optimized for both short duration electromagnetic signals and long duration electromagnetic signals.

Second, since each channel receiver monitors a contiguous segment of a broad electromagnetic spectrum, an electromagnetic signal can trigger output signals from several channel receivers. As a result, the analyzing system must direct resources, at least temporarily, to resolve where in the frequency spectrum the signal is located, and the analyzing system often is delayed in directing resources to the signal or signals of real interest.

Third, as a result of noise and modulation of a signal's rising and falling edges, an individual channel receiver can falsely report multiple detections from a single incoming signal. These false detections also waste the resources of the analyzing system.

As a final matter, the configuration of current channelizing receivers imposes inherent limitations on signal-to-noise sensitivity and on the quality of information provided to the analyzing system. These inherent limitations reduce the overall quality and reliability of these systems.

SUMMARY OF THE INVENTION

In one aspect, the present invention provides a channelizing receiver. The channelizing receiver includes a plurality of channel receivers. Each of the channel receivers includes a plurality of filters, and each of the filters receives an input signal representing electromagnetic signals falling within a frequency range being monitored by the channel receiver. Each of the filters also transmits an output signal representing electromagnetic signals falling within a segment of this frequency range.

The channelizing receiver further includes a plurality of threshold detectors. Each of the threshold detectors receives one of the output signals and produces a detection signal if the one output signal exceeds a predetermined threshold.

The channelizing receiver further includes a signal amplitude calculation unit for receiving the output signals and the detection signals. The signal amplitude calculation unit starts an initial timing period in response to the receipt of one of the detection signals indicating detection of an electromagnetic signal and produces a magnitude signal providing the magnitude during the initial timing period of the output signal to which the one detection signal corresponds.

The channelizing receiver also includes a channel to channel arbitration unit for receiving the magnitude signal and a first other magnitude signal from a first other channel receiver of the channelizing receiver produced in response to the first other channel receiver's detection of the electromagnetic signal during the initial timing period within a first other frequency range being monitored by the first other channel receiver. The channel to channel arbitration unit compares the magnitude signal and the first other magnitude signal, and if the first other magnitude signal is greater than the magnitude signal, inhibits the transmission from the channel receiver of data responsive to the one detection signal.

The magnitude signal preferably provides the peak amplitude reached during the initial timing period by the output signal, and the plurality of filters preferably comprises a plurality of low pass filters having different cut-off frequencies. The electromagnetic signals preferably are radio frequency signals.

The channel to channel arbitration unit also preferably is adapted for receiving a second other magnitude signal from a second other channel receiver of the channelizing receiver produced in response to the second other channel receiver's detection of the electromagnetic signal during the initial timing period within a second other frequency range being monitored by the second other channel receiver, comparing the magnitude signal with the second other magnitude signal, and if one or both of the first other magnitude signal and the second other magnitude signal is greater than the magnitude signal, inhibiting the transmission from the channel receiver of the data.

The signal amplitude calculation unit preferably also is adapted for initiating an additional timing period in response to the one detection signal, identifying a group of the threshold detectors producing detection signals during the additional timing period and producing a peak amplitude signal providing the peak amplitude reached during the additional timing period by the output signal corresponding to the detection signal produced by the threshold detector of the group associated with the low pass filter having the lowest cut-off frequency.

Each channel receiver preferably also includes a bandwidth and frequency estimation unit for receiving the peak amplitude signal and a first other peak amplitude signal from the first other channel receiver produced in response to the first other channel receiver's detection of the electromagnetic signal during the additional timing period, and for producing an estimation signal providing an estimate of the frequency and bandwidth of the electromagnetic signal based upon the peak amplitude signal and the first other peak amplitude signal.

The bandwidth and frequency estimation unit preferably is further adapted for receiving a second other peak amplitude signal from a second other channel receiver of the channel receiver produced in response to the second other channel receiver's detection of the electromagnetic signal during the additional timing period within a second other frequency range being monitored by the second other channel receiver, and producing the estimation signal based upon the peak amplitude signal, the first other peak amplitude signal and the second other peak amplitude signal.

The signal amplitude calculation unit also preferably is adapted for identifying the peak amplitude by identifying a predetermined number of consecutive samples of the one output signal having values less than the peak amplitude.

In another aspect, the present invention provides a method for detecting an electromagnetic signal falling within a frequency band. The method includes providing a channelizing receiver having a plurality of channels with a bandpass filter for transmitting signals within a segment of the frequency band. The method further includes providing for each channel a channel processor for receiving the signals, producing a detection signal indicating the detection of the electromagnetic signal and producing a magnitude signal indicating the magnitude of the electromagnetic signal.

The method further includes identifying within a predetermined time period a group of the channel processors producing the detection signals and comparing for the group the magnitude signals corresponding to the detection signals to identify the highest magnitude signal. The process also includes transmitting for the group from the channelizing receiver data corresponding to one of the detection signals only if the one detection signal is associated with the highest magnitude signal.

The method preferably further includes assessing the relative magnitudes of the magnitude signals of the group and, based upon these relative magnitudes, providing an estimate of the frequency and bandwidth of the electromagnetic signal. The data preferably includes this estimate and information identifying the beginning of a pulse of the electromagnetic signal and the end of the pulse. The electromagnetic signal preferably is a radio frequency signal.

DETAILED DESCRIPTION OF THE PREFERRED EMBODIMENTS

Figure 1A:
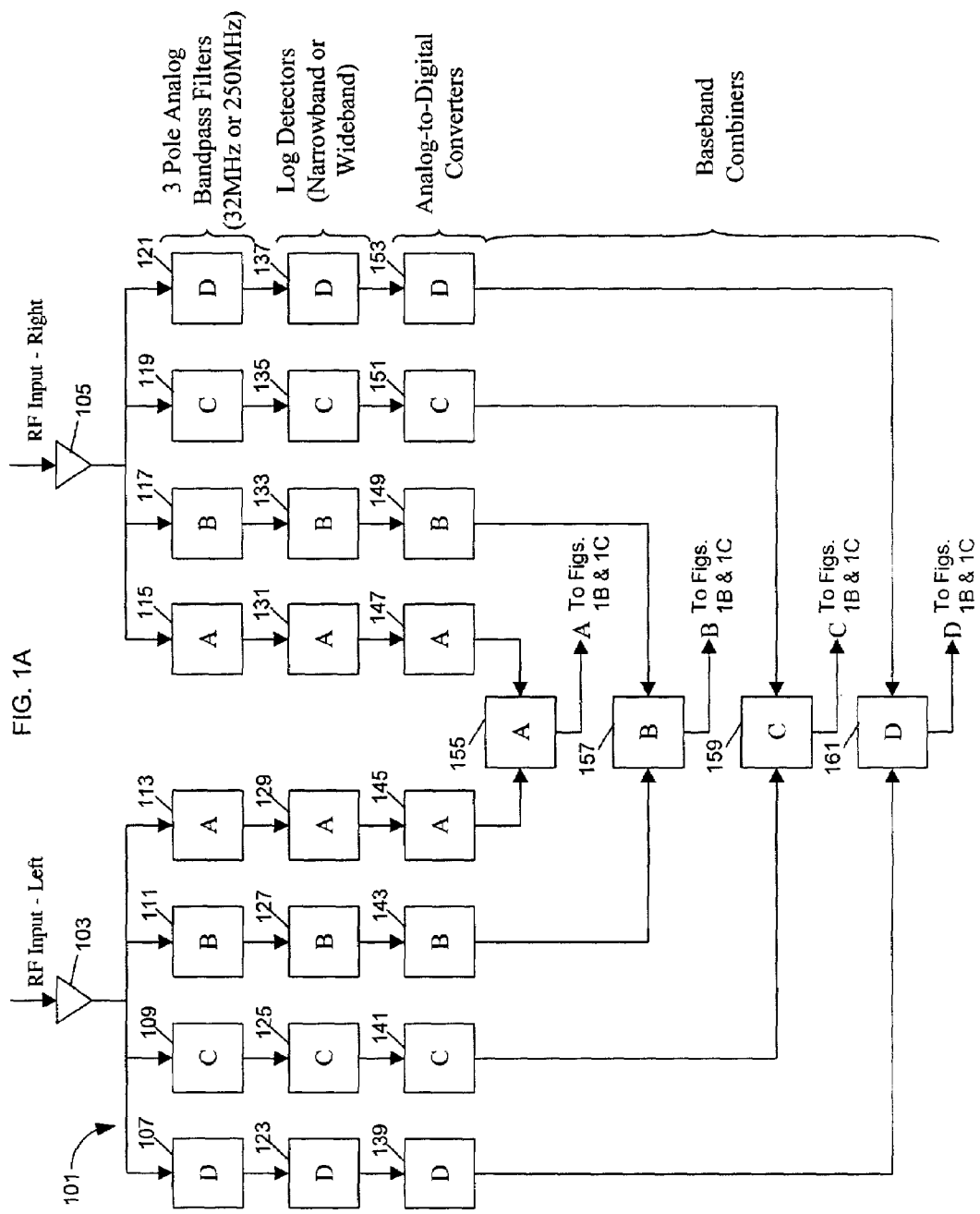
FIGS. 1A, 1B and 1C are a block diagram of a channelizing receiver in accordance with the present invention.
Figure 1B:
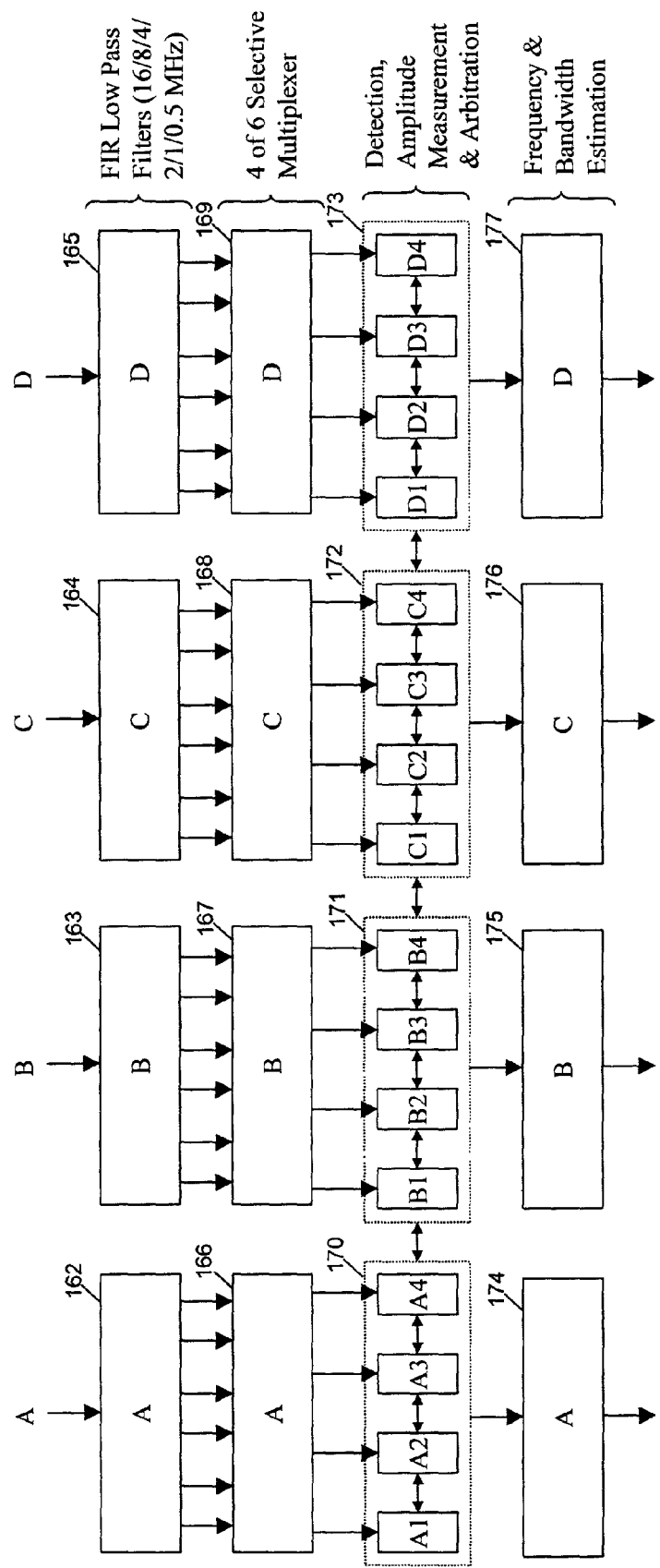
Figure 1C:
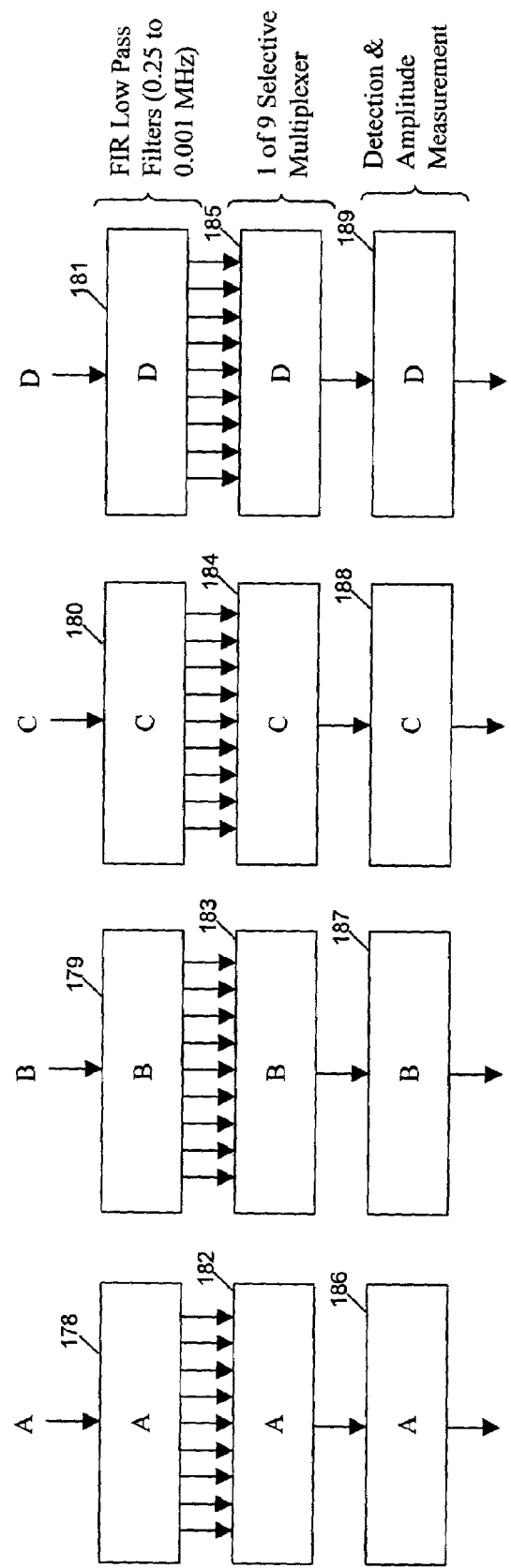

A channelizing receiver 101 in accordance with the present invention is shown in FIGS. 1A, 1B and 1C. For ease of description, channelizing receiver 101 is shown in these figures with only four channel receivers, namely, channel receiver A, channel receiver B, channel receiver C and channel receiver D. The components of each of these channel receivers are correspondingly labeled with these letters. For most applications, however, channelizing receiver 101 will contain more than only four channel receivers (e.g., 16 channel receivers, 20 channel receivers, etc.).

Channel receivers A, B, C and D all separately monitor one segment of a band of frequencies within the electromagnetic spectrum. For most applications, the segments are contiguous and the band of frequencies is continuous within the RF Spectrum. However, if desired, the segments can be separated, and the band of frequencies can be discontinuous. The number of channel receivers employed in channelizing receiver 101, and the bandwidth of each channel receiver, can be selected to correspond with the frequency range of the electromagnetic signals being monitored and the expected magnitude of these signals.

As shown in FIGS. 1A, 1B and 1C, each channel receiver of channelizing receiver 101 contains a plurality of left-side components and a plurality of right-side components. Orthogonally polarized antennas (not shown) receive electromagnetic emissions within the frequency band being monitored. Both left and right polarized electromagnetic signals are then detected by the channelizing receiver 101. The particular portion of the frequency spectrum being monitored can be selected by adjusting the frequency of a local oscillator (not shown) prior to channelizing receiver 101. The left-side components receive one of the orthogonally polarized electromagnetic signals, and the right-side components receive the other orthogonally polarized electromagnetic signal. The left-side orthogonally polarized electromagnetic signals and the right-side orthogonally polarized electromagnetic signals are transmitted to, respectively, buffer amplifiers 103 and 105. The outputs from these buffer amplifiers are transmitted to the front ends of the respective sides of the channel receivers.

As further shown in FIG. 1A, the output of buffer amplifier 103 is transmitted to analog bandpass filters 113, 111, 109 and 107 for, respectively, the left-side components of channel receiver A, channel receiver B, channel receiver C and channel receiver D. In a similar manner, the output of buffer amplifier 105 is transmitted to analog bandpass filters 115, 117, 119 and 121 for, respectively, the right-side components of channel receiver A, channel receiver B, channel receiver C and channel receiver D.

These bandpass filters preferably are three-pole analog bandpass filters with equal frequency and roll-off characteristics. Each bandpass filter defines the particular monitoring center frequency and frequency range or bandwidth (e.g., a range of 32 MHz, 250 MHz, etc.) of each channel receiver with which the bandpass filter is associated. Each bandpass filter passes electromagnetic signals within its designated frequency range and rejects electromagnetic signals outside of this range.

As further shown in FIG. 1A, the outputs from left-side analog bandpass filters 113, 111, 109 and 107 are transmitted to, respectively, left-side log detectors 129, 127, 125 and 123. In a similar manner, the outputs from right-side analog bandpass filters 115, 117, 119 and 121 are transmitted to, respectively, right-side log detectors 131, 133, 135 and 137. The electromagnetic input signals to the log detectors generally are high density pulses having narrow widths and large variations in amplitude. The log detectors condense these large variations into smaller, manageable variations using a logarithmic transfer function. The voltage amplitude of each log detector's output analog signal (called a video signal) is proportional to the power of its input signal in decibels (dBs). Such log detectors are well known in the art. The dynamic range of each log detector preferably is at least 60 dB. This range provides sufficient sensitivity for each channel receiver to effectively monitor a wide spectrum of electromagnetic frequencies for coincident signals in a dense environment. Depending upon the width of the electromagnetic spectrum being monitored, the bandwidths of these video output signals preferably are between approximately 16 MHz and 20 MHz. Of course, detectors with other bandwidths may be employed within the scope of the invention.

As further shown in FIG. 1A, the outputs from left-side log detectors 129, 127, 125 and 123 are transmitted to, respectively, left-side analog to digital (A/D) converters 145, 143, 141 and 139. In a similar manner, the outputs from right-side log detectors 131, 133, 135 and 137 are transmitted to, respectively, right-side A/D converters 147, 149, 151 and 153. These A/D converters sample the analog video signals from the log detectors and provide digital signals representative of these analog signals. The sampling rate and resolution of these A/D converters preferably are, respectively, approximately 62.5 million samples per second and 8 bits. Of course, other sampling rates and resolutions may be employed within the scope of the invention.

The left-side and right-side digitized, video signals from the A/D converters for channel receivers A, B, C and D are combined by, respectively, baseband combiners 155, 157, 159 and 161. These baseband combiners sum for each channel the channel's left-side and right-side digital samples. These samples, as indicated above, represent the respective orthogonal components of each video signal. The baseband combiners and all subsequent functional elements are preferably field programmable gate arrays (FPGAs) or application specific integrated circuits (ASICs).

The summing step performed by the baseband combiners, if desired, can be omitted. In that event, the orthogonal components for only the left side of each channel, or the orthogonal components for only the right side of each channel, can be processed separately. In yet a further alternative, the orthogonal components for both sides of each channel can be processed in parallel without summing.

FIG. 1B illustrates further components of the channel receivers of channelizing receiver 101. As shown in this figure, the output signals from baseband combiners 155, 157, 159 and 161 are transmitted to, respectively, finite impulse response (FIR) low pass filters 162, 163, 164 and 165. Each FIR filter has a sequential series of outputs, and each of these outputs transmits a narrower band of frequency signals, i.e., each has a lower cut off frequency. For example, as shown in FIG. 1B, each FIR low pass filter preferably has six taps, and the cut off frequency of each tap preferably is one octave below (i.e., one-half) the cut off frequency of each next wider tap. These cut off frequencies, and the other coefficients of these filters, preferably are adjusted to detect short pulse, wideband RF emissions. A preferable set of cut off frequencies for these six taps is, e.g., 16 MHz, 8 MHz, 4 MHz, 2 MHz, 1 MHz and 0.5 MHz. These cut off frequencies, and the characteristics of each FIR low pass filter, preferably are modifiable through field programmable gate arrays. In lieu of FIR filters, other low pass filters may be employed within the scope of the invention, e.g., infinite response filters. FIR filters are preferred, however, because of their enhanced stability.

As further shown in FIG. 1B, the six output signals from FIR filters 162, 163, 164 and 165 are transmitted to, respectively, multiplexers 166, 167, 168 and 169. Each multiplexer preferably has four outputs, receives six inputs and is capable of selecting any of its six inputs for transmission to any of these four outputs. Of course, other combinations of inputs to outputs may be employed within the scope of the invention. The particular connections of inputs to outputs preferably also are field programmable.

The output signals from multiplexers 166, 167, 168 and 169 are transmitted to, respectively, threshold detector groups 170, 171, 172 and 173. Each threshold detector group preferably includes a separate threshold detector for each output of the multiplexer with which it is associated. Each threshold detector of each threshold detector group, therefore, receives an input from a different FIR low pass filter tap. The threshold level and detection criteria of these threshold detectors preferably also are field programmable. The detection criteria includes, e.g., the number of samples above a particular threshold necessary to assert an output signal, the number of samples below this threshold necessary to de-assert this output signal, and the number of consecutive samples that must occur with values below the output signal's most recent maximum to declare this maximum the true peak value. The programmability of these detection criteria enables channelizing receiver 101 to be adjusted to detect a broad range of electromagnetic signals with minimal false triggering.

Each threshold detector group also contains logic circuitry for performing an arbitration process. This arbitration process occurs among the threshold detectors of a threshold detector group detecting a signal and the threshold detectors of adjacent threshold detector groups also detecting the signal. The arbitration process, discussed in detail below, chooses from among these threshold detectors a particular threshold detector for transmitting an output signal to the analyzing receiver (not shown).

As further shown in FIG. 1B, the output signals from threshold detector groups 170, 171, 172 and 173 are transmitted to, respectively, frequency and bandwidth estimators 174, 175, 176 and 177. Pursuant to the arbitration process, only one of these frequency and bandwidth estimators receives a signal from a threshold detector group and provides, in response, an output signal to the analyzing receiver. The frequency and bandwidth estimators contain logic circuitry to provide, with this output signal, an estimation of the frequency and bandwidth of the detected signal within the detecting channel. This information is intended to facilitate the analyzing receiver's analysis of the received RF emissions. The process for providing this estimation is discussed in detail below.

FIG. 1C illustrates further components of the channel receivers of channelizing receiver 101. These further components operate in parallel to those shown in FIG. 1B. As shown in FIG. 1B, the output signals from baseband combiners 155, 157, 159 and 161 also are transmitted to, respectively, FIR low pass filters 178, 179, 180 and 181. Like FIR low pass filters 162, 163, 164 and 165, FIR low pass filters 178, 179, 180 and 181 also preferably have a sequential series of output taps, e.g., as shown in FIG. 1C, nine output taps, and each of these output taps transmits a narrower band of frequency signals, i.e., has a lower cut off frequency. Also, like FIR low pass filters 162, 163, 164 and 165, the cut off frequency of each tap preferably is one octave below the cut off frequency of each wider tap. A preferable set of cut off frequencies for the nine taps of each low pass filter 178, 179, 180 and 181 is, e.g., 0.25 MHz, 0.125 MHz, 0.0625 MHz, 0.0313 MHz, 0.0156 MHz, 0.0078 MHz, 0.0039 MHz, 0.0020 MHz and 0.0010 MHz. These cut off frequencies, and the coefficients of each FIR low pass filter, preferably also are modifiable through field programmable gate arrays. Also, in lieu of FIR low pass filters, other filters may be employed for this purpose, e.g., infinite response filters.

As indicated above, the cut off frequencies of FIR low pass filters 162, 163, 164 and 165 (FIG. 1B), and the other characteristics of these filters, preferably are adjusted to detect short pulse, wideband RF emissions. The cut off frequencies of FIR low pass filters 178, 179, 180 and 181 (FIG. 1C), and the other characteristics of these filters, on the other hand, preferably are adjusted to detect long pulse, narrowband, or continuous wave (CW), RF emissions, i.e., RF emissions within a narrow bandwidth and having a far longer duration than the short pulses falling within a wide bandwidth for which FIR low pass filters 162, 163, 164 and 165 are designed to detect.

As further shown in FIG. 1C, the nine output signals from FIR filters 178, 179, 180 and 181 are transmitted to, respectively, multiplexers 182, 183, 184 and 185. Unlike multiplexers 166, 167, 168 and 169, however, each of multiplexers 182, 183, 184 and 185 has only one output. Each multiplexer is capable of selecting any one of its nine inputs for transmission to this one output. Of course, if desired, each multiplexer 182, 183, 184 and 185, like multiplexers 166, 167, 168 and 169, can have a plurality of outputs and can select from among its inputs a plurality of these inputs for transmission on these outputs.

The output signals from multiplexers 182, 183, 184 and 185 are transmitted to, respectively, threshold detectors 186, 187, 188 and 189. Each of these threshold detectors is similar to one threshold detector of threshold detector groups 170, 171, 172 and 173. Like the threshold detectors of these threshold detector groups, therefore, the threshold level and detection criteria of threshold detectors 186, 187, 180 and 189 also preferably are field programmable. These detection criteria include, e.g., the number of samples above a particular threshold necessary to assert an output signal, the number of samples below this threshold necessary to de-assert this output signal, and the number of consecutive samples that must occur with values below the output signal's most recent maximum to declare this maximum the true peak value. The output signals from these threshold detectors are transmitted to the analyzing receiver.

As discussed above, threshold detector groups 170, 171, 172 and 173 each include logic circuitry for conducting a process of arbitration among the threshold detectors of the group and the threshold detectors of the groups adjacent to the group. This arbitration process results in the transmission of signal data to the analyzing receiver from only the channel threshold detector group where the majority of the signal's spectral energy is located. As a result, the analyzing receiver does not waste its resources in analyzing numerous signals generated by the channel receivers in response to a single detected signal. The logic circuitry for this arbitration process preferably comprises field programmable gate arrays (FPGAs) or application specific integrated circuits (ASICs).

A threshold detector of threshold detector groups 170, 171, 172 and 173 generates a detection signal in response to the detector's receipt of a predetermined number of samples from the FIR low pass filter tap to which the detector is connected (FIR signal) above the detector's predetermined threshold. Requiring a predetermined number of samples above this threshold before generating a detection signal minimizes the occurrences of false detections from noise and miscellaneous RF background signals. Each detection signal from a threshold detector is transmitted to the logic circuitry of the channel receiver with which the threshold detector is associated and also to the logic circuitry of the channel receivers adjacent to this channel receiver. The first threshold detector to indicate detection of a signal initiates predetermined timing periods for conducting two levels of arbitration. The first level of arbitration is among threshold detector groups of adjacent channels for the purpose of identifying the channel frequency band where the received RF emission is most likely located. The second level of arbitration is among the threshold detectors within an individual channel's threshold detector group. In this second level of arbitration, the purpose is to identify the threshold detector associated with the most optimal FIR LPF cutoff frequency for estimating the frequency and bandwidth of the received RF emission signal.

If a channel receiver is located centrally within the frequency band being monitored by channelizing receiver 101 (e.g., channel receiver B or C), the adjacent channel receivers are the channel receiver monitoring frequencies immediately above and below these monitoring frequencies. On the other hand, if a channel receiver is monitoring frequencies at the lower end of the frequency band being monitored by channelizing receiver 101 (e.g., channel receiver A) or the upper end of the frequency band being monitored by channelizing receiver 101 (e.g., channel receiver D), the adjacent channel receivers are, respectively, the two contiguous channel receivers monitoring frequencies immediately above these monitoring frequencies and the two contiguous channel receivers monitoring frequencies immediately below these monitoring frequencies (e.g., in each case, channel receivers B and C).

During the first timing period for the first level of arbitration, the channel group containing the initiating threshold detector will determine the peak value of the FIR signal associated with that detector. The peak value is determined from an incoming series of FIR data samples by continually seeking to identify incoming samples with a maximum value and only declaring that the last maximum sample is the peak value after a predetermined number of consecutive samples have been received with values less than the maximum. Also during this first timing period, the channel threshold detector groups immediately adjacent to the initiating channel group will each determine the peak value of the FIR signal received by the threshold detector that first generates a detection signal. The peak value for each adjacent channel threshold detector group is determined in the same manner as for the initiating channel. By the end of this timing period, the peak FIR signal value for each channel triggered by the detected signal is determined and communicated to each channel's respective adjacent channel pair.

During the second timing period for the second level of arbitration, each threshold detector group in which at least one threshold detector has been triggered determines the peak value of the FIR signal received by the triggered threshold detector associated with the lowest cut off frequency tap. Peak values are determined in the same manner as previously described. By the end of second level arbitration time period, this peak FIR signal for each channel is determined and communicated to each channel's respective adjacent channel pair.

When the first level of arbitration values are received by a channel or when the end of the first time period has occurred, a channel will determine if it has won arbitration. If a channel does not receive a peak value from an adjacent channel by the end of the first time period, the peak value for that channel is assumed to be zero. The winner of the first level of arbitration preferably is the channel which received the maximum peak FIR signal compared to all respective adjacent channels during the timing period.

The channel that determines it has won the first level of arbitration generates a signal to the analyzing receiver indicating a pulse RF emission event has occurred within the frequency range of that channel. This channel then proceeds to use the values from the second level of arbitration determined for that channel and received from adjacent channels to estimate signal frequency and bandwidth. A channel that determines it has lost the first level of arbitration ignores the second level arbitration values, clears itself and provides no output signal to the analyzing receiver.

As indicated above, each channel receiver conducts arbitrations independently of every other channel receiver. The results of arbitration are dependent on the data exchanged in parallel between adjacent channels. As a result, a detected signal will result in several threshold detector groups independently conducting arbitrations among the detectors of their groups and their adjacent groups. These independent arbitrations are parallel and nearly simultaneous. If a channel receiver conducting an arbitration loses the arbitration to one of its adjacent channel receivers, therefore, an arbitration conducted by one of those adjacent channel receivers, or one of the channel receivers adjacent to one of those adjacent channel receivers, etc., eventually will win an arbitration and provide a signal to the analyzing receiver. Because of these multiple, independent arbitrations, however, this winning channel receiver is the channel receiver monitoring the frequency band most closely related to the frequency of the detected RF signal.

For example, referring to the threshold detectors of FIG. 1B, if threshold detector B2 detects an input signal exceeding its predetermined threshold for the required number of samples, threshold detector B2 generates a detection signal which is transmitted to the logic circuitry of this detector's group, namely, group 171, and the threshold detector groups adjacent to this detector group, namely, detector groups 170 and 172. In each case, the logic circuitry's receipt of this first detection signal initiates an independent timing period for the logic circuitry of the group to conduct two levels of arbitration among the detectors of the group and the detectors of the groups adjacent to the group. In the case of threshold detector group 171, e.g., this detection signal initiates timing periods for arbitration among threshold detectors B1, B2, B3 and B4 and also among the adjacent threshold detectors, namely, threshold detectors A1, A2, A3 and A4 and threshold detectors C1, C2, C3 and C4.

During the first level timing period, the logic circuitry for threshold detector group 171 determines the peak FIR signal received by threshold detector B2. During this first level timing period, the logic circuitry of threshold detector groups 170 and 172, triggered by the logic circuitry of threshold detector group 171, also execute identical arbitration among the detectors of their respective adjacent groups. For example, if, during this timing period, the first threshold detector of threshold detector group 170 providing an output signal is threshold detector A3 and the first threshold detector of threshold detector group 172 providing an output signal is threshold detector C1, the logic circuitry of these groups will determine the peak FIR signal received by, respectively, threshold detectors A3 and C1.

During the second level timing period, the logic circuitry for threshold detector group 171 determines whether threshold detectors B3 and/or B4 also provide a detection signal. These detectors are associated with a tap of the FIR low pass filter 163 having successively lower cutoff frequencies than that of the tap with which threshold detector B2 is associated. Dependent on preset limits, the logic circuitry will select the peak FIR signal received from the threshold detector associated with the lowest cutoff frequency available within this second timing period. For example, if threshold detector B4 provides an output signal whose peak value is determinable within the second timing period, then that value will be output to adjacent channel groups 170 and 172 as the second level arbitration for group 171. If neither threshold detectors B3 or B4 generates a signal within the second timing period, then the peak value of threshold detector B2 is output at the second level arbitration for group 171. If during the second timing period, threshold detectors A4 and C4 (threshold detectors with the lowest cutoff frequencies associated with threshold detector groups 170 and 172, respectively) provide output signals whose peak values are determinable within the second timing period, then these values are output to adjacent channel groups as the second level arbitration values for groups 170 and 172, respectively.

At the conclusion of the arbitration timing periods, the logic circuitry for threshold detector group 171 receives the peak values from among the detectors of this initiating detector group and adjacent detector groups 170 and 172. For this example, as indicated above, the first level arbitration values are from threshold detectors B2, A3 and C1. Also, assume that the second level arbitration values are from threshold detectors B4, A4 and C4. The winner of the arbitration among the three channel receivers in this example with respect to group 171 is the channel receiver having the highest first level arbitration peak FIR signal. If threshold detector group 171 wins this arbitration, then channel receiver B provides an output signal to the analyzing receiver and proceeds to estimate frequency and bandwidth using the second level arbitration values from detector groups 170, 171 and 172. Additionally, detector groups 170 and 172 halt further processing and their respective channel logic circuitries are cleared to receive the next pulse signal. Therefore, channel receivers A and C provide no output signal to the analyzing receiver.

As discussed above, frequency and bandwidth estimators 174, 175, 176 and 177 include logic circuitry for providing to the analyzing receiver an estimation of the frequency and bandwidth of the detected signal to facilitate the efficiency of the analyzing receiver's analysis of this signal. This logic circuitry also preferably comprises field programmable gate arrays (FPGAs) or application specific integrated circuits (ASICs).

A frequency and bandwidth estimator, like a threshold detector group, provides a signal to the analyzing receiver only if the channel receiver with which the frequency and bandwidth estimator is associated wins an arbitration. If a channel receiver loses the arbitration, processing by the channel receiver's associated frequency and bandwidth estimator is not initiated.

The frequency and bandwidth estimator of a channel receiver winning arbitration receives the second level arbitration values of the winning channel receiver and the two adjacent losing channel receivers. Since the frequency bandwidth monitored by the winning channel receiver is known, the identity of this channel receiver in itself provides a coarse estimate of the detected signal's frequency.

Using the three second level arbitration values, the frequency and bandwidth estimator consults a lookup table. Depending upon the magnitude of the values, this lookup table provides information more precisely indicating the detected signal's frequency within the bandwidth monitored by the winning channel receiver. For example, assume detector B2 of detector group 171 is the winner in an arbitration among the threshold detectors of adjacent groups 170 and 172. Assume also that the peak values from threshold detectors B4, A4 and C4 were selected during the second level arbitration for groups 171, 170 and 172, respectively. Also, assume that the magnitude of the value generated by threshold detector A4 is relatively greater than the magnitude of the value generated by threshold detector C4. Under these circumstances, the lookup table will indicate that the detected signal's frequency within the bandwidth monitored by channel receiver B leans toward the frequency being monitored by channel receiver A. On the other hand, if the magnitude of the value generated by threshold detector C4 is relatively greater than the magnitude of the value generated by the threshold detector A4, then the lookup table will indicate that the detected signal's frequency within the bandwidth monitored by channel receiver B leans toward the frequency band monitored by channel receiver C. A copy of this lookup table is stored within a memory of the frequency and bandwidth estimator of each channel receiver.

A second lookup table also is stored within the memory of the frequency and bandwidth estimator of each channel receiver. Using again the three second level arbitration values, the frequency and bandwidth estimator uses this second lookup table to provide an indication of the detected signal's bandwidth within the frequency band monitored by the winning channel receiver. In a manner similar to that for estimating frequency, this second lookup table indicates that the bandwidth of the detected pulse is relatively narrow, if the magnitude of the second level arbitration values of the adjacent channel receivers are relatively small in comparison to the magnitude of the second level arbitration value generated by the winning channel receiver. On the other hand, if the magnitudes of the second level arbitration values of the adjacent channel receivers are relatively equal to the magnitude of the second level arbitration values generated by the winning channel receiver, the second lookup table will indicate that the bandwidth of the detected pulse is relatively wide.

The frequency and bandwidth estimator for a winning channel receiver transmits, via an interface (not shown), a digital signal to the analyzing receiver providing these estimates of the detected signal's frequency and bandwidth. This interface also transmits a signal indicating the detected signal's start of pulse and end of pulse. The detected signal's start of pulse is based upon the signal generated by the detector winning first level arbitration. The detected signal's end of pulse is based upon the time at which the detected signal falls below this winning detector's predetermined threshold for the requisite number of samples. Finally, this interface also transmits a digital signal to the analyzing receiver providing the peak amplitude of the detector winning first level arbitration.

Figure 2:
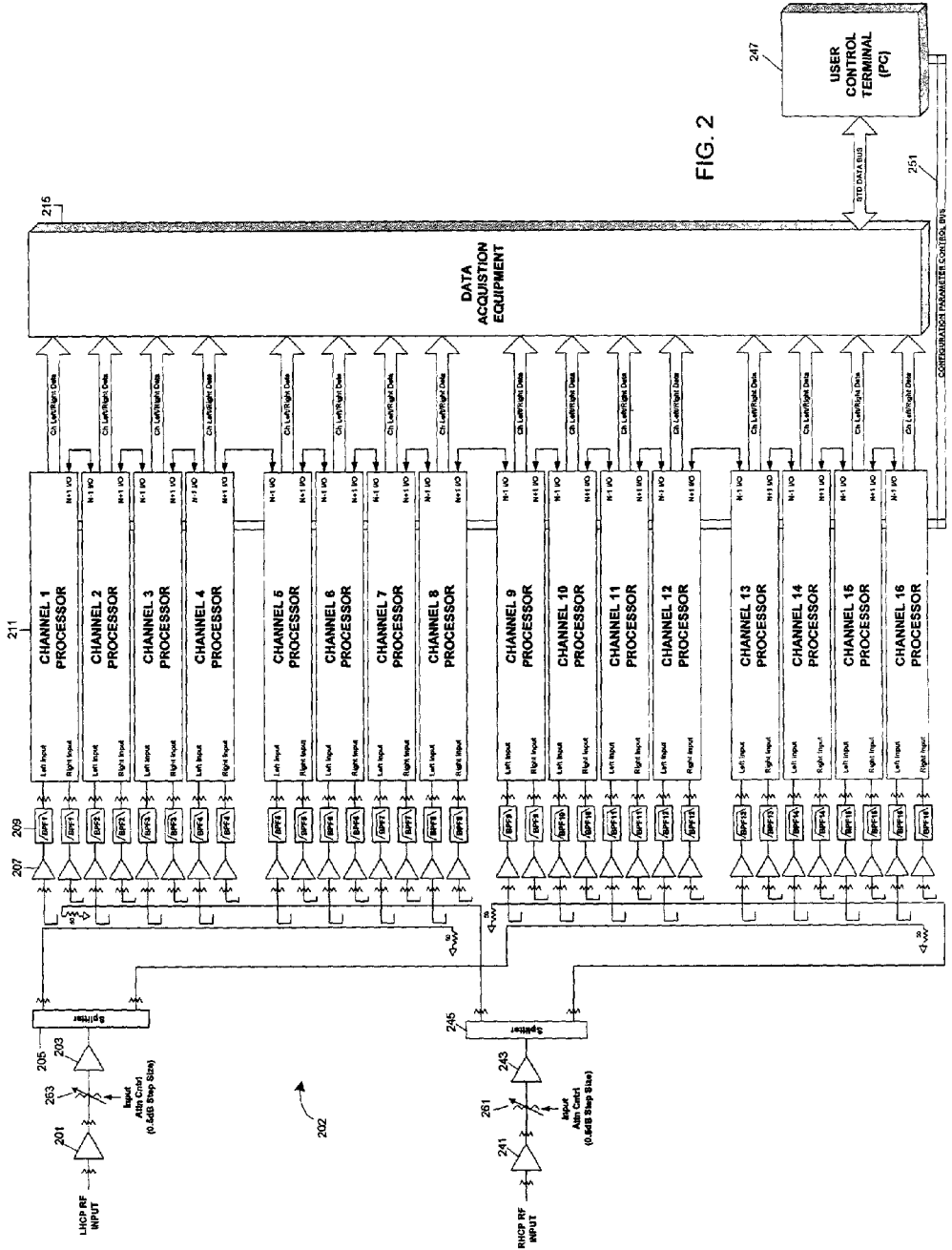
FIG. 2 is a block diagram of a wideband channelizing receiver in accordance with the present invention.

A block diagram for a wideband channelizing receiver 202 in accordance with the present invention is shown in FIG. 2. Wideband channelizing receiver 202 contains 16 channel receivers. Each of these channel receivers is configured to monitor one contiguous segment of a continuous 4000 MHz bandwidth. The bandwidth of each channel receiver of channelizing receiver 202, therefore, is 250 MHz.

Each channel receiver of channelizing receiver 202 contains a channel processor 211, two bandpass filters 209 and two buffer amplifiers 207. The buffer amplifiers provide inputs to the bandpass filters. Each of these channel processors contains a set of left-side components and a set of right-side components. In a manner similar to channelizing receiver 101, polarizing antennas detect signals transmitted to channelizing receiver 202 and generate orthogonally polarized electromagnetic signals. The left-side components of the channel processors receive one of these orthogonally polarized electromagnetic signals, and the right-side components receive the other orthogonally polarized electromagnetic signal. The left-side orthogonally polarized electromagnetic signals and the right-side orthogonally polarized electromagnetic signals are transmitted to, respectively, buffer amplifiers 201 and 241. The output signals from buffer amplifiers 201 and 241 are transmitted to, respectively, input attenuators 263 and 261. These input attenuators enable control of the amplitudes of these output signals in steps of 0.5 dB.

The output signals from input attenuators 263 and 261 are transmitted to, respectively, buffer amplifiers 203 and 243, and the output signals from these buffer amplifiers are transmitted to, respectively, splitters 205 and 245. Each splitter has two outputs. The outputs for splitter 205 are transmitted via a series of 3-way couplers to the inputs of buffer amplifiers 207 which are connected to the inputs of bandpass filters 209 transmitting signals to the left-side components of the channel receivers. The outputs from splitter 245, on the other hand, are transmitted via a series of 3-way couplers to the inputs of buffer amplifiers 207 which are connected to the inputs of bandpass filters 209 transmitting signals to the right-side components of the channel receivers.

The outputs from channel processors 211 are transmitted to data acquisition equipment 215. Data acquisition equipment 215 collects the outputs from the various channel processors and transmits these outputs to a resource allocation system (not shown). The resource allocation system transmits the data to other systems for further analysis, if warranted, such as an analyzing receiver. These other systems can modify the settings of all predetermined values including filter coefficients, threshold levels, detection criteria, timeouts, lookup tables and the input attenuation settings by communicating requests via the user control terminal 247. The outputs to the data acquisition equipment 215 include, as discussed above in connection with channelizing receiver 101, signals from the channel processors winning arbitration providing estimations of a detected signal's amplitude, frequency and bandwidth, as well as a pulse signaling the starting time and ending time of the detected signal. The various field programmable coefficients for configuring the components of channelizing receiver 202, discussed above in connection with channelizing receiver 101, are entered on user control terminal 247 and transmitted from this terminal to channelizing receiver 202 on configuration parameter control bus 251. User control terminal 247 may be, e.g., a personal computer, special purpose computer, programmed microprocessor or any other device capable of receiving these coefficients from a user and transmitting them to the channel processors.

Figure 3:
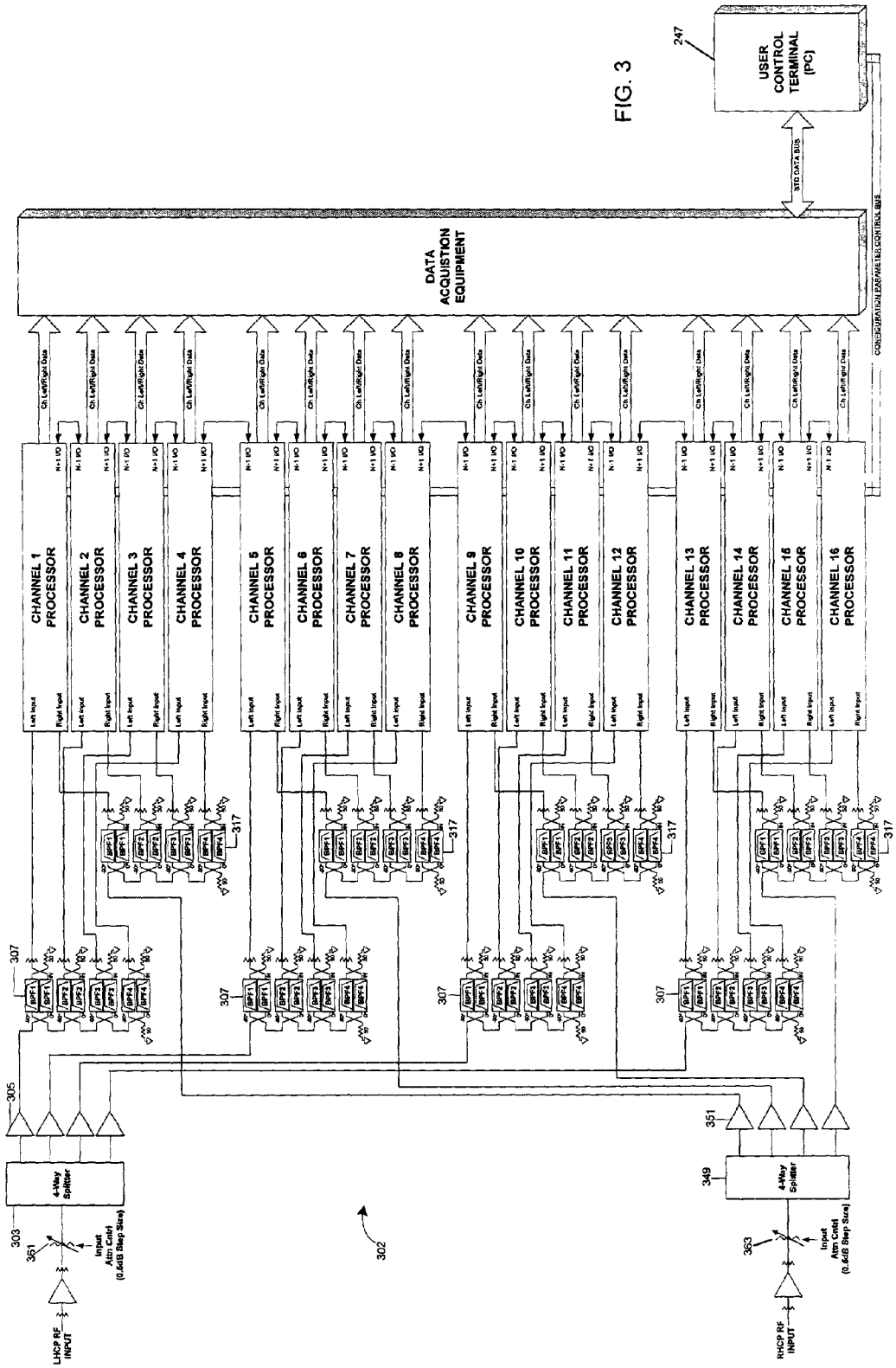
FIG. 3 is a block diagram of a narrowband channelizing receiver in accordance with the present invention.

A narrowband channelizing receiver 302 in accordance with the present invention is shown in FIG. 3. Narrowband channelizing receiver 302 is functionally similar to wideband channelizing receiver 202. The bandwidth of each channel receiver, however, is only 32 MHz. Narrowband channelizing receiver 302, therefore, monitors a continuous bandwidth of only 512 MHz.

As shown in FIG. 3, the output signals from input attenuators 361 and 363 are transmitted to, respectively, 4-way splitters 303 and 349. The four outputs from 4-way splitter 303 are transmitted via buffer amplifiers 305 and then again divided by four before input to bandpass filters 307. These 16 bandpass filters transmit signals to the left-side components of the 16 channel processors. The four outputs from 4-way splitter 349, on the other hand, are transmitted via buffer amplifiers 351 and then again divided by four before input to bandpass filters 317. These 16 bandpass filters transmit signals to the right-side components of the 16 channel processors.

Figure 4:
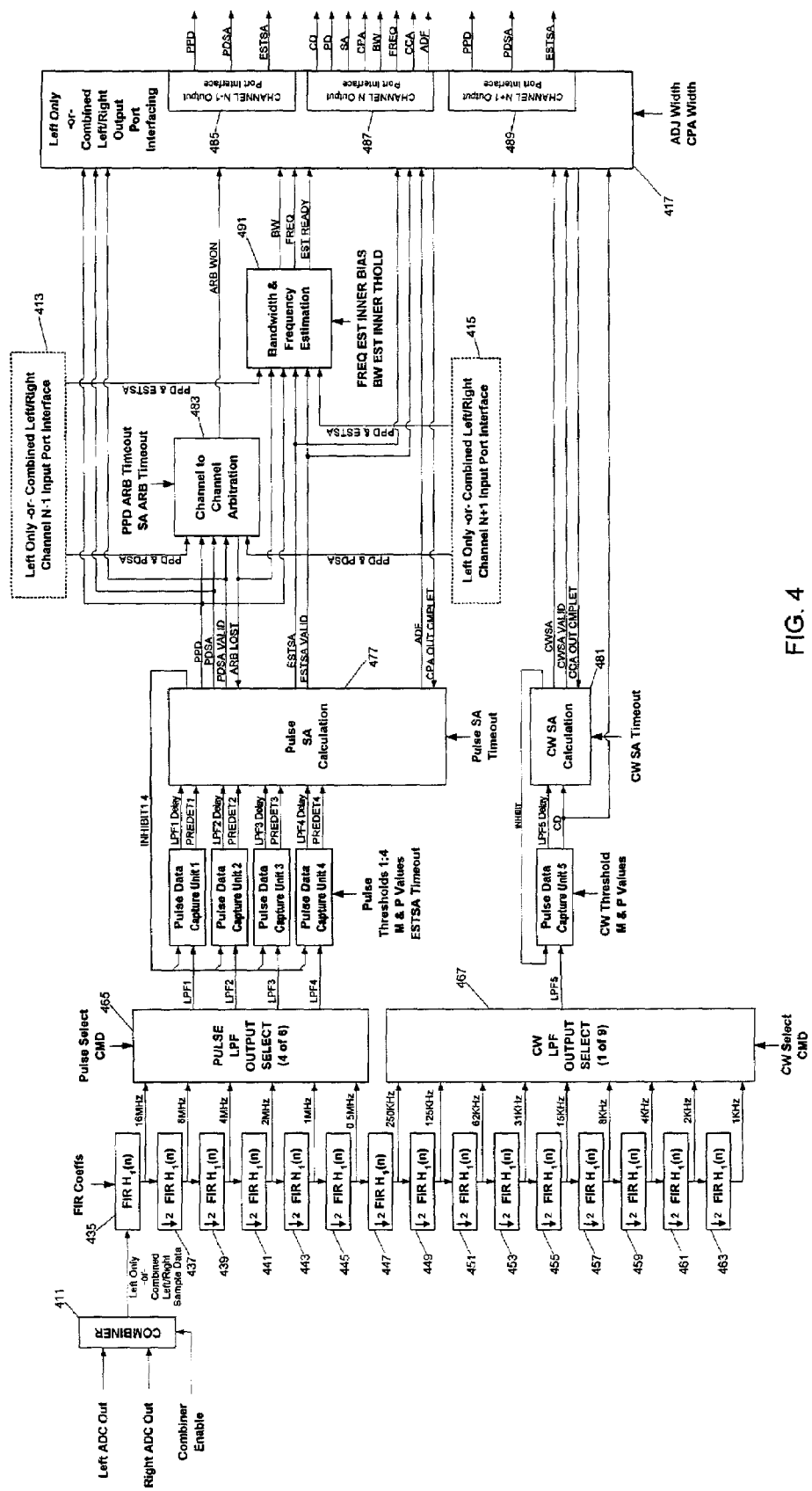
FIG. 4 is a block diagram of the left-side components of a channel processor for one channel receiver of the channelizing receivers of FIGS. 2 and 3.

The channel processors for channelizing receivers 202 and 302 each contain a plurality of left-side components and a plurality of right-side components. A block diagram for the left-side components of a single channel processor N for these channelizing receivers is shown in FIG. 4. The right-side components for the channel processor are identical.

The left-side and right-side digitized, video data samples from the log detectors and A/D converters (not shown) are transmitted to combiner 411. If combiner 411 is enabled, the channel's left-side and right-side digital samples are summed and further processed by only the channel's left-side components. In that event, the channel's right-side components are disabled. On the other hand, if combiner 411 is disabled, and the channel's left-side and right-side components are enabled, then the channel's left-side signals are separately processed by its left-side components, and the channel's right-side signals are separately processed by its right-side components. Arbitration among adjacent channels for the channel's left-side components is with respect to only the adjacent channel's left-side components and vice versa.

The output signal from combiner 411 is transmitted through a series of FIR low pass filters, namely, FIR low pass filters 435, 437, 439, 441, 443, 445, 447, 449, 451, 453, 455, 457, 459, 461 and 463. The cut off frequencies of these FIR low pass filters decrease one octave at a time. These cut off frequencies are 16 MHz, 8 MHz, 4 MHz, 2 MHz, 1 MHz, 0.5 MHz, 250 KHz, 125 KHz, 62 KHz, 31 KHz, 15 KHz, 8 KHz, 4 KHz, 2 KHz and 1 KHz. The coefficients for these FIR low pass filters are stored in internal registers and are programmable from user control terminal 247 (FIGS. 2 and 3). FIR low pass filters 435, 437, 439, 441, 443 and 445 are used for the detection of short pulse, wideband RF emissions and transmit their outputs to FIR output selector 465. FIR low pass filters 447, 449, 451, 453, 455, 457, 459, 461 and 463 are used for the detection of long pulse, narrowband, or continuous wave (CW), RF emissions, and transmit their outputs to FIR output selector 467.

LPF output selector 465 receives six inputs and transmits four outputs. A pulse select command from, e.g., user control terminal 247 or the analyzing receiver, causes LPF output selector 465 to select which of these six inputs are transmitted to the selector's four outputs. LPF output selector 467, on the other hand, receives nine inputs and transmits only one output. A CW select command from, e.g., these same sources causes this selector to select which of these nine inputs is transmitted to this one output.

The four low pass filter outputs from LPF output selector 465, namely, LPF1, LPF2, LPF3, and LPF4, are transmitted to, respectively, pulse data capture unit 1, pulse data capture unit 2, pulse data capture unit 3 and pulse data capture unit 4. The one output from LPF output selector 467 is transmitted to pulse data capture unit 5. These LPF signals are a clocked series of digital samples which are transmitted to the pulse data capture units at the frequency of the system's internal clock as decimated by the FIR LPF filters. The thresholds and detection criteria for these pulse data capture units also are stored in registers and are transmitted from, e.g., user control terminal 247. These detection criteria include the data capture unit's threshold value, the number of samples above this threshold value necessary to produce a signal detection (M value) and the number of samples below this threshold value necessary to terminate a signal detection (P value).

Each pulse data capture unit monitors its input for digital samples above the unit's threshold value. If M consecutive samples occur above the unit's threshold value, the pulse data capture unit asserts a pre-detect signal (PREDET). Pulse data capture units 1, 2, 3 and 4 will assert, under these circumstances, PREDET1, PREDET2, PREDET3 and PREDET4, respectively. The first pulse data capture unit asserting a PREDET signal in response to a detected signal is designated the "target unit." This PREDET signal is transmitted to pulse signal amplitude (SA) calculation unit 477. This initial PREDET signal causes pulse SA calculation unit 477 to transmit a pre-pulse detect (PPD) signal to channel to channel arbitration unit 483 and to bandwidth and frequency estimation unit 491.

In addition to channel to channel arbitration unit 483, the PPD signal from pulse SA calculation unit 477 also is transmitted to channel N−1 output port interface 485 and channel N+1 output port interface 489 of output port interfacing 417. These output port interfaces transmit the PPD signal to the channel to channel arbitration units of channel processor N−1 and channel processor N+1, respectively. Channel to channel arbitration unit 483 also receives PPD signals from channel processors N−1 and N+1 via channel N−1 input port interface 413 and channel N+1 input port interface 415, respectively.

The target pulse data capture unit's assertion of its PREDET signal causes pulse SA calculation unit 477 to begin monitoring delayed samples of the LPF data (LPF delay data) transmitted by the target pulse data capture unit for the peak amplitude of the detected signal (PDSA). Pulse data capture units 1, 2, 3 and 4 transmit to pulse SA calculation unit 477 LPF1 delay data, LPF2 delay data, LPF3 delay data and LPF4 delay data, respectively. The peak amplitude value (PDSA) is determined by the process of continuously monitoring the LPF delay data samples from a pulse data capture unit for maximum values and declaring the last maximum value the peak only when immediately followed by a consecutive series of lower value samples equal to the number value set by the predetermined pulse SA timeout. The pulse SA timeout also is stored in a register and is programmable from, e.g., user control terminal 247.

The target pulse data capture unit's assertion of its PREDET signal also causes pulse SA calculation unit 477 to transmit an inhibit signal to each pulse data capture unit having a number lower than that of the target unit. These lower numbered units receive LPF data from an FIR low pass filter having a cut off frequency higher than that of the FIR low pass filter with which the target unit is associated. The signal amplitudes of the LPF data received by these lower numbered pulse data capture units are not used in the first level arbitration process or in the second level arbitration process for the subsequent estimation of the detected signal's bandwidth and frequency. Further monitoring and calculation of the LPF delay data from these lower numbered units, therefore, are unnecessary.

Monitoring of the LPF delay data from the target pulse data capture unit for the peak amplitude of the detected signal (PDSA) continues until this peak amplitude is identified or the target pulse data capture unit's PREDET signal becomes inactive. In the latter case, the PDSA is set to the maximum amplitude identified at the time that the PREDET signal becomes inactive. Upon identifying the PDSA, pulse SA calculation unit 477 transmits to channel to channel arbitration unit 483 the PDSA and a signal indicating that the PDSA is valid (PDSA valid signal). The PDSA and PDSA valid signals also are transmitted to channel N−1 output port interface 485 and channel N+1 output port interface 489. These output port interfaces transmit the PDSA and PDSA valid signals to the channel to channel arbitration units of channel processors N−1 and N+1, respectively. Channel to channel arbitration unit 483 also receives PDSA and PDSA valid signals from channel processor N−1 and channel processor N+1 via channel N−1 input port interface 413 and channel N+1 input port interface 415, respectively.

Assertion of the target pulse data capture unit's PREDET signal also initiates the ESTSA timeout. During this timing period, the pulse SA calculation unit 477 also monitors the PREDET signals from the pulse data capture units having a number higher than that of the target unit. If any of these pulse data capture units asserts its PREDET signal, the pulse SA calculation unit 477 monitors the LPF delay data received from the respective pulse data capture unit to identify the peak amplitude of these data. This monitoring is performed in the same manner as for the LPF delay data from the target pulse data capture unit to determine this unit's peak amplitude. This process continues for each of the higher numbered pulse data capture units until either the expiration of the ESTSA timeout or the maximum amplitude of the LPF data received by the pulse data capture unit having the highest allowed number is identified (ESTSA). Upon identifying the ESTSA, pulse SA calculation unit 477 transmits the ESTSA to bandwidth and frequency estimation unit 491. Pulse SA calculation unit 477 also transmits to bandwidth and frequency estimation unit 491 a signal indicating that the ESTSA is valid (ESTSA valid signal). The ESTSA and ESTSA valid signals also are transmitted to channel N−1 output port interface 485 and channel N+1 output port interface 489. These output port interfaces transmit the ESTSA and ESTSA valid signals to the bandwidth and frequency estimation units of channel processors N−1 and N+1, respectively. Bandwidth and frequency estimation unit 491 also receives ESTSA and ESTSA valid signals from channel processors N−1 and N+1 via channel N−1 input port interface 413 and channel N+1 input port interface 415, respectively. The ESTSA timeout and highest allowed ESTSA pulse data capture unit value are stored in a register and are programmable from, e.g., user control terminal 247.

The one low pass filter output from LPF output selector 467 is transmitted to pulse data capture unit 5. Like pulse data capture units 1–4, pulse data capture unit 5 monitors its input for LPF5 data above the unit's predetermined threshold value. If M consecutive samples of LPF5 data occur above this threshold value, pulse data capture unit 5 asserts a continuous wave detection signal (CD). The CD signal is transmitted to CW SA calculation unit 481 and also to channel N output port interface 487 of output port interfacing 417. This CD signal causes CW SA calculation unit 481 to begin monitoring delayed samples of LPF5 data from pulse data capture unit 5 for the peak amplitude of the detected continuous wave signal (CWSA). The CWSA is determined by continuously monitoring the LPF5 delay data samples from pulse data capture unit 5 for maximum values and declaring the last maximum value the peak only when immediately followed by a consecutive series of lower value samples equal to a predetermined number (CW SA timeout). Upon identification of the CWSA, CW SA calculation unit 481 transmits an inhibit signal to pulse data capture unit 5 to prevent further assertion of the CD signal. If the CD signal becomes inactive before this maximum amplitude is determined, the CWSA is set to the maximum amplitude identified at the time that the CD signal becomes inactive. The CW SA timeout also is stored in internal registers and is programmable from, e.g., user control terminal 247. Upon identifying the CWSA, CW SA calculation unit 481 transmits the CWSA to channel N output port interface 487 of output port interfacing 417. CW SA calculation unit 481 also transmits to output port interface 487 a signal indicating that the CWSA is valid (CWSA VALID).

Channel to channel arbitration unit 483 remains in a standby condition until a PPD signal from either pulse SA calculation unit 477, channel N−1 input port interface 413 or channel N+1 input port interface 415 is received. Upon receipt of a PPD signal from any of these sources, channel to channel arbitration unit 483 initiates a process of arbitration among channel processors N, N−1 and N+1. In accordance with this process, channel to channel arbitration unit 483 loads a digital timer with the programmable value PPD ARB timeout and a second digital timer with the programmable value SA ARB timeout. Like the other programmable timeout values of the channel processors, these timeout values also are stored in internal registers and may be transmitted to the channel processor from, e.g., user control terminal 247.

PPD ARB timeout and SA ARB timeout both define timing periods. Upon receipt of a PPD signal from either pulse SA calculation unit 477, channel N−1 input port interface 413 or channel N+1 input port interface 415, channel to channel arbitration unit 483 monitors during the PPD ARB timeout the sources from which a PPD signal was not received for the receipt of a PPD signal from these other sources. For example, if a PPD signal initially is received from channel N−1 input port interface 413, channel to channel arbitration unit 483 monitors the inputs from pulse SA calculation unit 477 and channel N+1 input port interface 415 during the PPD ARB timeout for the receipt of a PPD signal from either or both of these other sources.

During the SA ARB timeout, channel to channel arbitration unit 483 monitors the initial source of the PPD signal and each source from which a PPD signal was received during the PPD ARB timeout for the receipt of PDSA and PDSA valid signals. A non-initial source from which no PPD signal is received during the PPD ARB timeout is no longer considered part of the arbitration process and, therefore, is not monitored for such a signal during the SA ARB timeout. If a monitored source does not transmit a PDSA valid signal during the SA ARB timeout, the PDSA for the source is considered to be zero. Upon receipt of a PDSA valid signal during the SA ARB timeout from a source, channel to channel arbitration unit 483 latches the PDSA signal from the source.

In accordance with the arbitration algorithm of channel to channel arbitration unit 483, if the initial PPD signal transmitted to channel to channel arbitration unit 483 in response to a detected signal is not from pulse SA calculation unit 477, and pulse SA calculation unit 477 does not transmit a PPD signal during the PPD ARB timeout, channel N loses the arbitration. On the other hand, if the initial PPD signal transmitted to channel to channel arbitration unit 483 is not from channel N−1 input port interface 413 or channel N+1 input port interface 415 and neither of these interfaces transmits a PPD signal to channel to channel arbitration unit 483 during the PPD ARB timeout, channel N wins the arbitration. If neither of these conditions occurs, then the winner of the arbitration is the channel which transmitted to channel to channel arbitration unit 483 the highest PDSA. For example, if the PDSA signal from pulse SA calculation unit 477 has the highest magnitude, channel N wins the arbitration. On the other hand, if the PDSA signal from either channel N−1 or channel N+1 is greater than the magnitude of the PDSA signal from channel N, channel N loses the arbitration. In the event that the PDSA signals from two channels are equal, the winner of the arbitration is the channel monitoring the lowest frequency band (e.g., N−1 or N).

If channel N loses the arbitration, channel to channel arbitration unit 483 transmits an arbitration lost signal (ARB LOST) to pulse SA calculation unit 477 and bandwidth and frequency estimation unit 491. Upon receipt of this signal, these units terminate further calculations and return to a standby condition. On the other hand, if channel N wins the arbitration, channel to channel arbitration unit 483 transmits an arbitration won signal (ARB WON) to output port interfacing unit 417.

Like channel to channel arbitration unit 483, bandwidth and frequency estimation unit 491 remains in a standby condition until a PPD signal from either pulse SA calculation unit 477, channel N−1 input port interface 413 or channel N+1 input port interface 415 is received. Upon receipt of a PPD signal from any of these sources, bandwidth and frequency estimation unit 491 initiates two timeout periods as part of the process to estimate the detected signal's bandwidth and frequency for the analyzing receiver. Bandwidth and frequency estimation unit 491 utilizes two programmable coefficients to execute this process within the predetermined timeout periods (PPD EST TIMEOUT and SA EST TIMEOUT), namely, frequency estimate inner bias (FREQ EST INNER BIAS) and bandwidth estimate inner threshold (BW EST INNER THOLD). As with the other programmable predetermined values, these timeouts and coefficients also are stored in registers and are transmitted from, e.g., user control terminal 247.

First, within the period set by the PPD EST TIMEOUT, the bandwidth and frequency estimation unit 491 must receive PPD signals from pulse SA calculation unit 477, channel N−1 input port interface 413 and channel N+1 input port interface 415. Next, within the period set by the SA EST TIMEOUT, the bandwidth and frequency estimation unit 491 must receive ESTSA data from channels N, N−1 and N+1. If these conditions are not satisfied, the bandwidth and frequency estimation process is terminated immediately, and an error code is output in place of the frequency estimate code. The frequency and bandwidth estimations utilize the ESTSA data from channels N, N−1 and N+1, designated in the formulas below as, respectively, ESTSAN, ESTSAN−1 and ESTSAN+1, to calculate two variables, namely, LACD and RACD. These formulas are:

$$LACD = (ESTSAN) - (ESTSAN-1) \quad (1)$$

$$RACD = (ESTSAN) - (ESTSAN+1) \quad (2)$$

LACD and RACD are used to calculate a frequency metric F in accordance with the following formula:

$$F = LACD/(LACD+RACD) \quad (3)$$

The frequency estimation (FREQ) is a two bit value based upon a comparison of F to FREQ EST INNER BIAS. If F is less than FREQ EST INNER BIAS, the frequency is estimated to be biased toward the lower frequency band. The two bit value for this condition is 00. On the other hand, if F is equal to or greater than FREQ EST INNER BIAS, the frequency is estimated to be biased toward the upper frequency band. The two bit value for this condition is 11.

To estimate bandwidth, a bandwidth metric B, also based upon LACD and RACD, is calculated in accordance with the following formula:

$$B = LACD + RACD \quad (4)$$

BW EST INNER TROLD is a 16-word by 9-bit lookup table which bandwidth and frequency estimation unit 491 indexes using the frequency metric F to obtain BW EST INNER THOLD. The bandwidth estimate (BW) is a single bit which is based upon a comparison of the bandwidth metric B to the value of BW EST INNER THOLD obtained from the lookup table. If B is less than BW EST INNER THOLD, then the bandwidth of the detected pulse is estimated to be wide. Under this condition, BW is set to a 1. On the other hand, if B is greater than or equal to BW EST INNER THOLD, then the bandwidth of the detected pulse is estimated to be narrow. Under this condition, BW is set to a 0.

When the calculations of the bandwidth and frequency estimations are complete and the BW and FREQ signals are set to their correct values, bandwidth and frequency estimation unit 491 transmits an estimation ready signal (EST READY) to output port interfacing 417. Bandwidth and frequency estimation unit 491 transmits the BW and FREQ signals to channel N output port interface 487 of output port interfacing 417.

Channel N−1 output port interface 485 and channel N+1 output port interface 489 transmit the PPD, PDSA and ESTSA signals from channel N to channels N−1 and N+1, respectively. A signal (not shown) from each of these interfaces is asserted when these signals are valid. The time period that these output signals are asserted (ADJ width) also is a programmable coefficient.

Channel N output port interface 487 transmits a plurality of signals to the resource allocation system. These signals include: the continuous wave detection signal from pulse data capture unit 5 (CD signal); the PPD signal from pulse SA calculation unit 477 (PD signal); the PDSA signal from pulse SA calculation unit 477 or the CWSA signal from CW SA calculation unit 481 (SA signal); a signal indicating that the SA signal is valid and corresponds to the PDSA signal (CPA signal); the BW signal from bandwidth and frequency estimation unit 491 (BW signal); the FREQ signal from bandwidth and frequency estimation unit 491 (FREQ signal); a signal indicating that the SA signal is valid and corresponds to the CWSA signal (CCA signal); and the ADF signal from pulse SA calculation unit 477 identifying the target pulse data capture unit (ADF signal). If channel N does not win an arbitration conducted by channel N, only the CD signal, CWSA signal and the CCA signal can be transmitted to the resource allocation system. The remaining signals, namely, the PPD signal, the PDSA signal, the CPA signal, the BW signal, the FREQ signal and the ADF signal all correspond to the detection of a pulse. These signals, therefore, are transmitted to the resource allocation system only if channel N wins the arbitration Upon receipt of an ARB WON signal, channel N output port interface 487 immediately transmits the PD signal to the resource allocation system. Channel N output port interface 487 continues this transmission for the duration of the PPD input signal from pulse SA calculation unit 477. Channel N output port interface 487 latches the PDSA and ADF signals, and the BW and FREQ signals, respectively, upon receipt of the PDSA VALID signal from pulse SA calculation unit 477 and the EST READY signal from bandwidth and frequency estimation unit 491. Upon the occurrence of these latchings, the CPA signal is asserted to indicate that these data are ready and valid. The width of the CPA pulse also is a programmable coefficient of from between 1 and 16 clock cycles (CPA width coefficient).

Channel N output port interface 487 immediately transmits the CD signal upon receipt from pulse data capture unit 5. Upon receipt of the CWSA VALID signal from CW SA calculation unit 481, the CWSA value from this unit is latched onto the SA output of channel N output port interface 487 and a pulse is asserted on the CCA output to indicate that these data are ready and valid for a continuous wave detection. As indicated above, these transmissions occur regardless of the outcome of the arbitration for a pulse detection.

Each transfer of pulse or continuous wave data from channel N output port interface 487 occurs upon completion of the previous transfer of such data. If the PD and CD signals are ready and valid, however, these signals are transferred to the resource allocation system immediately without waiting for such completion.

Output port interfacing 417 transmits a signal to pulse SA calculation unit 477 upon completion of a transfer of pulse data to the resource allocation system to indicate that the interfacing is available for receipt of additional pulse data (CPA OUT CMPLET signal). In a similar manner, output port interfacing 417 transmits a signal to CW SA calculation unit 481 upon completion of a transfer of CW data to the resource allocation system to indicate that the interfacing is available for the receipt of additional CW data (CCA OUT CMPLET signal).

The channel processor preferably is fabricated using field programmable gate arrays or application specific integrated circuits on one or more chips and circuit boards. In the alternative, the logic and functions described above for the channel processor may be implemented using any circuitry capable of executing these functions and logic, e.g., a programmed microprocessor, special purpose computer, discrete hard-wired logic gates, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A channelizing receiver, said channelizing receiver including a plurality of channel receivers, each said channel receiver comprising:
   a plurality of filters, each of said filters receiving an input signal representing electromagnetic signals falling within a frequency range being monitored by said channel receiver and transmitting an output signal representing electromagnetic signals falling within a segment of said frequency range;
   a plurality of threshold detectors, each of said threshold detectors receiving one of said output signals and producing a detection signal if said one output signal exceeds a predetermined threshold;
   a signal amplitude calculation unit for receiving said output signals and said detection signals, starting an initial timing period in response to the receipt of one of said detection signals indicating detection of an electromagnetic signal and producing a magnitude signal providing the magnitude during said initial timing period of the output signal to which said one detection signal corresponds; and
   a channel to channel arbitration unit for receiving said magnitude signal and a first other magnitude signal from a first other channel receiver of said channelizing receiver produced in response to said first other channel receiver's detection of said electromagnetic signal during said initial timing period within a first other frequency range being monitored by said first other channel receiver, comparing said magnitude signal and said first other magnitude signal, and if said first other magnitude signal is greater than said magnitude signal, inhibiting the transmission from said channel receiver of data responsive to said one detection signal.

2. A channelizing receiver as in claim 1, wherein said magnitude signal provides the peak amplitude reached during said initial timing period by said output signal.

3. A channelizing receiver as in claim 2, wherein said signal amplitude calculation unit is adapted for identifying said peak amplitude by identifying a predetermined number of consecutive samples of said corresponding output signal having values less than said peak amplitude.

4. A channelizing receiver as in claim 1, wherein said plurality of filters comprises a plurality of low pass filters having different cut off frequencies.

5. A channelizing receiver as in claim 4, wherein said signal amplitude calculation unit is adapted for initiating an additional timing period in response to said one detection signal, identifying a group of said threshold detectors producing detection signals during said additional timing period and producing a peak amplitude signal providing the peak amplitude reached during said additional timing period by the output signal corresponding to the detection signal produced by the threshold detector of said group associated with the low pass filter having the lowest cut off frequency.

6. A channelizing receiver as in claim 5, wherein each said channel receiver further comprises a bandwidth and frequency estimation unit for receiving said peak amplitude signal and a first other peak amplitude signal from said first other channel receiver produced in response to said first other channel receiver's detection of said electromagnetic signal during said additional timing period, and producing an estimation signal providing an estimate of the frequency and bandwidth of said electromagnetic signal based upon said peak amplitude signal and said first other peak amplitude signal.

7. A channelizing receiver as in claim 6, wherein said bandwidth and frequency estimation unit is adapted for receiving a second other peak amplitude signal from a second other channel receiver of said channelizing receiver produced in response to said second other channel receivers s detection of said electromagnetic signal during said additional timing period within a second other frequency range being monitored by said second other channel receiver, and producing said estimation signal based upon said peak amplitude signal, said first other peak amplitude signal and said second other peak amplitude signal.

8. A channelizing receiver as in claim 7, wherein said first other frequency range is immediately below said frequency range and said second other frequency range is immediately above said frequency range.

9. A channelizing receiver as in claim 1, wherein said channel to channel arbitration unit is adapted for permitting the transmission from said channel receiver of said data if said first other magnitude signal is less than said magnitude signal.

10. A channelizing receiver as in claim 9, wherein said data provides the beginning of a pulse of said electromagnetic signal, the end of said pulse and an estimate of the frequency and bandwidth of said pulse.

11. A channelizing receiver as in claim 1, wherein said channel to channel arbitration unit is adapted for receiving a second other magnitude signal from a second other channel receiver of said channelizing receiver produced in response to said second other channel receiver's detection of said electromagnetic signal during said initial timing period within a second other frequency range being monitored by said second other channel receiver, comparing said magnitude signal with said second other magnitude signal, and if one or both of said first other magnitude signal and said second other magnitude signal is greater than said magnitude signal, inhibiting the transmission from said channel receiver of said data.

12. A channelizing receiver as in claim 11, wherein said first other frequency range is immediately below said frequency range and said second other frequency range is immediately above said frequency range.

13. A channelizing receiver as in claim 11, wherein said channel to channel arbitration unit is adapted for permitting the transmission from said channel receiver of said data if both said first other magnitude signal and said second other magnitude signal are less than said magnitude signal.

14. A channelizing receiver as in claim 13, wherein said data provide the beginning of a pulse of said electromagnetic signal, the end of said pulse and an estimate of the frequency and bandwidth of said pulse.

15. A channelizing receiver as in claim 1, wherein each said channel receiver further comprises a multiplexer for receiving said output signals and selecting particular ones of said output signals for transmission to said threshold detectors.

16. A channelizing receiver as in claim 1, wherein said filters are finite impulse response filters.

17. A channelizing receiver as in claim 1, wherein each said channel receiver further comprises a bandpass filter for receiving from an antenna electromagnetic signals being monitored by said channelizing receiver and transmitting to said channel receiver said electromagnetic signals falling within said frequency range being monitored by said channel receiver.

18. A channelizing receiver as in claim 17, wherein each said channel receiver further comprises a log detector for receiving from said bandpass filter said electromagnetic signals being monitored by said channel receiver and providing an output signal proportional to the power of said electromagnetic signals being monitored by said channel receiver.

19. A channelizing receiver as in claim 18, wherein each said channel receiver further comprises an analog to digital converter for receiving said output signal from said log detector and providing a digital representation of said output signal for transmission to said plurality of filters.

20. A channelizing receiver as in claim 17, wherein said antenna is an orthogonally polarizing antenna for orthogonally polarizing said electromagnetic signals being monitored by said channelizing receiver.

21. A channelizing receiver as in claim 1, wherein said electromagnetic signals are radio frequency signals.

22. A channelizing receiver, said channelizing receiver including a plurality of channel receivers, each said channel receiver comprising:
 a threshold detector for receiving an input signal representative of an electromagnetic signal detected by said channel receiver and producing a detection signal if said input signal exceeds a predetermined threshold;
 an output interface for transmitting data responsive to said detection signal from said channel receiver;
 a signal amplitude calculation unit for producing a magnitude signal providing the magnitude of said input signal; and
 a channel to channel arbitration unit for comparing said magnitude signal to a first other magnitude signal from a first other channel receiver of said channelizing receiver produced in response to said first other channel receiver's detection of said electromagnetic signal, and if said magnitude signal is less than said first other magnitude signal, inhibiting said output interface from transmitting said data.

23. A channelizing receiver as in claim 22, wherein said channel to the channel arbitration unit is adapted for comparing said magnitude signal to a second other magnitude signal to a second other magnitude signal from a second other channel receiver of said channelizing receiver produced in response to said second other channel receiver's detection of said electromagnetic signal, and inhibiting said output interface from transmitting said data if said magnitude signal is less than one or both of said first other magnitude signal and said second other magnitude signal.

24. A channelizing receiver as in claim 23, wherein each said channel receiver further comprises a bandwidth and frequency estimation unit and wherein said data comprises an estimate of the bandwidth and frequency of said electromagnetic signal calculated by said bandwidth and frequency estimation unit on the basis of an additional magnitude signal produced by said signal amplitude calculation unit in response to said detection signal, a first other additional magnitude signal from said first other channel receiver produced in response to said first other channel receiver's detection of said electromagnetic signal and a second other additional magnitude signal from said second other channel receiver produced in response to said second other channel receiver's detection of said electromagnetic signal.

25. A channelizing receiver as in claim 24, wherein said data provides the beginning of a pulse of said electromagnetic signal, the end of said pulse and an estimate of the frequency and bandwidth of said pulse calculated by said bandwidth and frequency estimation unit.

26. A channelizing receiver as in claim 23, wherein said channel to channel arbitration unit is adapted for permitting the transmission from said output interface of said data if said magnitude signal is greater than both said first other magnitude signal and said second other magnitude signal.

27. A channelizing receiver as in claim 23, wherein said channel receiver is adapted for monitoring a segment of a frequency bandwidth monitored by said channelizing receiver, said first other channel receiver is adapted for monitoring a first other segment of said frequency bandwidth and said second other channel receiver is adapted for monitoring a second other segment of said frequency bandwidth.

28. A channelizing receiver as in claim 27, wherein said segment is contiguous to said first other segment and said second other segment.

29. A channelizing receiver as in claim 22, wherein said channel to channel arbitration unit is adapted for permitting the transmission from said output interface of said data if said magnitude signal is greater than said first other magnitude signal.

30. A channelizing receiver as in claim 22, wherein said signal amplitude calculation unit is adapted for identifying said magnitude of said input signal by identifying a predetermined number of consecutive samples of said input signal having values less than said magnitude.

31. A channelizing receiver as in claim 22, wherein said electromagnetic signal is a radio frequency signal.

32. A channelizing receiver as in claim 22, wherein each said channel receiver further comprises one or more further threshold detectors, each of said one or more further threshold detectors receiving a respective one of one or more further input signals representative of said electromagnetic signal detected by said channel receiver and producing a detection signal if said respective further input signal exceeds a predetermined threshold.

33. A channelizing receiver, said channelizing receiver including a plurality of channel receivers, each said channel receiver comprising:
   a first channel for receiving a first component of an electromagnetic signal, said first channel including a first bandpass filter for transmitting said first component if said first component has a frequency falling within the bandpass of said first bandpass filter, a first log detector for receiving said first component and providing a first video signal representative of said first component, a first analog to digital converter for receiving said first video signal and providing a first digital signal representative of said first video signal;
   a second channel for receiving a second component of said electromagnetic signal, said second channel including a second bandpass filter for transmitting said second component if said second component has a frequency falling within the bandpass of said second bandpass filter, a second log detector for receiving said second component and providing a second video signal representative of said second component, a second analog to digital converter for receiving said second video signal and providing a second digital signal representative of said second video signal;
   a baseband combiner for combining said first digital signal and said second digital signal to provide a combined digital signal; and
   a channel processor for receiving said combined digital signal and transmitting data responsive to the detection of said electromagnetic signal if the magnitude of said combined digital signal exceeds a predetermined threshold.

34. A channelizing receiver as in claim 33, wherein said channel processor is adapted for prohibiting the transmission of said data if the magnitude of said combined digital signal is less than the magnitude of a first other combined digital signal produced by a first other channel receiver of said plurality of channel receivers in response to said first other channel receiver's detection of said electromagnetic signal.

35. A channelizing receiver as in claim 34, wherein said data includes an estimate of the frequency and bandwidth of said electromagnetic signal calculated by said channel processor.

36. A channelizing receiver as in claim 33, wherein said data includes an estimate of the frequency and bandwidth of said electromagnetic signal calculated by said channel processor.

37. A channelizing receiver as in claim 33, wherein said baseband combiner is adapted for disabling said combining and transmitting to said channel processor only one of said first digital signal or said second digital signal.

38. A channelizing receiver as in claim 33, wherein said channel processor comprises a plurality of low pass filters having different cut off frequencies for receiving said combined digital signal and separating said combined digital signal into a plurality of separate signals falling within different frequency ranges.

39. A channelizing receiver as in claim 38, wherein said channel processor further comprises a multiplexer and a plurality of threshold detectors, said multiplexer being adapted for receiving said plurality of separate signals and selecting particular ones of said separate signals for transmission to particular ones of said threshold detectors, each of said threshold detectors producing a threshold signal if the separate signal received by said threshold detector exceeds a selected threshold.

40. A channelizing receiver as in claim 39, wherein said channel processor further comprises a signal amplitude calculation unit for receiving said threshold signals and said separate signals and producing during a selected period initiated by one of said threshold signals a peak amplitude signal providing the peak amplitude reached during said selected period of the separate signal to which said one threshold signal corresponds.

41. A channelizing receiver as in claim 40, wherein each said channel receiver further comprises a channel to channel arbitration unit for receiving said peak amplitude signal and a first other peak amplitude signal from a first other channel receiver of said channelizing receiver produced in response to said first other channel receiver's detection of said electromagnetic signal during said selected period, comparing said peak amplitude signal and said first other peak amplitude signal, and if said first other peak amplitude signal is greater than said peak amplitude signal, inhibiting said transmitting of said data responsive to the detection of said electromagnetic signal.

42. A channelizing receiver as in claim 38, wherein said plurality of low pass filters are adapted for detecting wideband electromagnetic signals and said channel processor further comprises a second plurality of low pass filters having different cut off frequencies for receiving said combined digital signal and separating said combined digital signal into a second plurality of separate signals falling within different frequency ranges, said second plurality of low pass filters being adapted for detecting narrowband electromagnetic signals.

43. A channelizing receiver as in claim 42, wherein said channel processor further comprises a multiplexer and a plurality of threshold detectors, said multiplexer being adapted for receiving said second plurality of separate signals and selecting one of said second plurality of separate signals for transmission to a threshold detector, said threshold detector producing a threshold signal if said one separate signal exceeds a selected threshold.

44. A channelizing receiver as in claim 43, wherein said channel processor further comprises a signal amplitude calculation unit for receiving said threshold signal and said one separate signal and producing during a selected period initiated by said threshold signal a peak amplitude signal providing the peak amplitude reached during said selected period of said separate signal.

45. A channelizing receiver as in claim 44, wherein each said channel receiver further comprises an output interface for receiving said peak amplitude signal and transmitting said peak amplitude signal to a resource allocation system.

46. A channelizing receiver as in claim 33, wherein said electromagnetic signal is a radio frequency signal.

47. A channelizing receiver as in claim 33, wherein said first component and said second component are received from one or more polarizing antennas, and said first component is a first polarized component of said electromagnetic signal and said second component is a second polarized component of said electromagnetic signal.

48. A channelizing receiver as in claim 47, wherein said one or more polarizing antennas are orthogonally polarizing antennas, and said first polarized component and said second polarized component are orthogonally polarized.

49. A method for detecting an electromagnetic signal falling within a frequency band, said method comprising:
   providing a channelizing receiver having a plurality of channels, each of said channels including a bandpass filter for transmitting signals within a segment of said frequency band;
   providing for each channel a channel processor for receiving said signals, producing a detection signal indicating the detection of said electromagnetic signal and producing a magnitude signal indicating the magnitude of said electromagnetic signal;
   identifying within a predetermined time period a group of said channel processors producing said detection signals;
   comparing for said group the magnitude signals corresponding to said detection signals to identify the magnitude signal indicating the highest magnitude; and
   transmitting for said group from said channelizing receiver data corresponding to one of said detection signals only if said one detection signal is associated with said magnitude signal indicating said highest magnitude.

50. A method as in claim 49, further comprising assessing the relative magnitudes of said magnitude signals of said group and wherein said data comprises information providing an estimate of the frequency and bandwidth of said electromagnetic signal based upon said relative magnitudes.

51. A method as in claim 50, wherein said data comprises information identifying the beginning of a pulse of said electromagnetic signal and the end of said pulse.

52. A method as in claim 49, wherein said magnitude signal indicates the peak amplitude of said electromagnetic signal reached during said predetermined time period.

53. A method as in claim 49, wherein each said segment of said frequency band is contiguous to at least one other segment of said frequency band.

54. A method as in claim 49, wherein said electromagnetic signal is a radio frequency signal.

55. A channelizing receiver, said channelizing receiver including a plurality of channel receivers, each said channel receiver comprising:
   receiving means for receiving an input signal representative of an electromagnetic signal detected by said channel receiver and producing a detection signal if said input signal exceeds a predetermined threshold;
   transmitting means for transmitting data responsive to said detection signal from said channel receiver;
   producing means for producing a magnitude signal providing the magnitude of said input signal; and
   comparing means for comparing said magnitude signal to a first other magnitude signal from a first other channel receiver of said channelizing receiver produced in response to said first other channel receiver's detection of said electromagnetic signal, and if said magnitude signal is less than said first other magnitude signal, inhibiting said transmitting means from transmitting said data.

56. A channelizing receiver as in claim 55, wherein said comparing means comprises means for comparing said magnitude signal to a second other magnitude signal from a second other channel receiver of said channelizing receiver produced in response to said second other channel receiver's detection of said electromagnetic signal, and inhibiting said transmitting means from transmitting said data if said magnitude signal is less than one or both of said first other magnitude signal and said second other magnitude signal.

57. A channelizing receiver as in claim 56, wherein each said channel receiver further comprises estimating means for estimating the bandwidth and frequency of said electromagnetic signal on the basis of an additional magnitude signal produced by said producing means in response to said detection signal, a first other additional magnitude signal from said first other channel receiver produced in response to said first other channel receiver's detection of said electromagnetic signal and a second other additional magnitude signal from said second other channel receiver.

58. A channelizing receiver as in claim 57, wherein said data further provides the beginning of a pulse of said electromagnetic signal, the end of said pulse and an estimate of the frequency and bandwidth of said pulse calculated by said estimating means.

59. A channelizing receiver as in claim 56, wherein said comparing means includes means for permitting the transmission from said output interface of said data if said magnitude signal is greater than both said first other magnitude signal and said second other magnitude signal.

60. A channelizing receiver as in claim 56, wherein said channel receiver further comprises means for monitoring a segment of a frequency bandwidth monitored by said channelizing receiver, said first other channel receiver comprises means for monitoring a first other segment of said frequency bandwidth and said second other channel receiver comprises means for monitoring a second other segment of said frequency bandwidth.

61. A channelizing receiver as in claim 60, wherein said segment is contiguous to said first other segment and said second other segment.

62. A channelizing receiver as in claim 55, wherein said comparing means includes means for permitting the transmission from said transmitting means of said data if said magnitude signal is greater than said first other magnitude signal.

63. A channelizing receiver as in claim 55, wherein said producing means comprises means for identifying said magnitude of said input signal by identifying a predetermined number of consecutive samples of said input signal having values less than said magnitude.

64. A channelizing receiver as in claim 55, wherein said electromagnetic signal is a radio frequency signal.

* * * * *